United States Patent
Baldwin et al.

[15] 3,674,742
[45] July 4, 1972

[54] PHOSPHORANE POLYESTERS AND POLYAMIDES

[72] Inventors: Roger A. Baldwin, La Mirada; Ming T. Cheng, Buena Park, both of Calif.

[73] Assignee: Kerr McGee Chemical Corp.

[22] Filed: Sept. 24, 1970

[21] Appl. No.: 75,283

Related U.S. Application Data

[62] Division of Ser. No. 793,630, Nov. 12, 1968, Pat. No. 3,629,296.

[52] U.S. Cl...........................260/47 P, 260/2 P, 260/280.3, 260/349, 260/502.4 P, 260/551 P, 260/931

[51] Int. Cl........................................................C08g 17/133

[58] Field of Search................................................260/47 P

[56] References Cited

UNITED STATES PATENTS

| | | | |
|---|---|---|---|
| 3,227,685 | 1/1966 | Nielsen et al. | 260/47 |
| 3,341,477 | 9/1967 | Washburn et al. | 260/2 |
| 3,402,145 | 9/1968 | Hull et al. | 260/54 |

*Primary Examiner*—Melvin Goldstein
*Attorney*—William G. Addison

[57] ABSTRACT

Bis(halophosphoranes) react with diamines or dihydroxy compounds to give phosphorane polyamides or polyesters respectively.

1 Claim, No Drawings

PHOSPHORANE POLYESTERS AND POLYAMIDES

This is a division of application, Ser. No. 793,630 filed Nov. 12, 1968 now U. S. Pat. No. 3,629,296.

This invention relates in general to novel high molecular weight compounds having two or more phosphorane linkages per molecule and to their methods of preparation. More particularly, this invention relates to the preparation of bis(azidophosphoranes), bis(halophosphoranes) and successively higher molecular weight polyphosphorane condensation products and to novel processes for preparing such materials.

Customarily, monomeric and polymeric phosphoranes have been prepared by the direct reaction of a phosphonylazide with a tertiary phosphine to yield higher molecular weight phosphorane materials. When phosphonyl diazides are reacted directly with phosphines valuable polyphosphoranes are obtained which have utility as fir-retardants and thermally stable plastics. However, such a process, while feasible, is not completely practicable commercially due to the serious safety problems arising by reason of the extreme shock sensitivity of organic phosphonyl diazide compounds. Because of this instability of the diazides, commercial purification of suitable monomers for polyphosphorane production has not been possible on a large scale. When impure phosphonyl diazides are utilized as starting materials without purification, the direct reaction with tertiary phosphines under prior art methods gives polymeric products with unsatisfactory physical and mechanical properties due to short chain length. Thus it has long been desired to prepare thermally stable polyphosphoranes by way of stable easily purified bisphosphoranes suitable for larger scale industrial handling.

It is therefore an object of the present invention to provide a new class of high molecular weight phosphorus and nitrogen-containing compounds having two phosphorane linkages per molecule, suitable for polyphosphorane production and to provide methods for the preparation of such bis-substituted phosphoranes. Being stable such compounds are readily purified for subsequent use in chemical polymerization and polycondensation reactions.

It is a further object of this invention to provide a new and novel class of mixed polyphosphoranes and new polycondensation products therefrom, and suitable methods for preparing such compounds.

Additional objects and advantages of this invention not specifically set forth above, will become apparent during the course of the discussion which follows.

A new stepwise method of preparation of polyphosphoranes has been discovered which gives essentially quantitative yields of a new type of product readily purified and suitable for further condensation to higher polymers. This new method avoids the problem of isolating the highly dangerous phosphonyl diazides, and instead utilizes new and useful derivatives having excellent thermal and shock stability.

For a more complete understanding of the nature of this invention the following chemical equations are presented, followed by illustrative examples. The basic chemistry involved in this new stepwise method may best be understood in terms of its application to the preparation of simple azidophosphorane and azidothiophosphorane compounds, as summarized in Examples 1 and 3 below. These polymer prototype compounds have excellent thermal and hydrolytic stability, and by further application of these methods to compounds having two phosphine groups per molecule, the bisphosphoranes of the present invention have been prepared.

The reaction of triphenylphosphine with phenylphosphonyl diazide was found to proceed in a stepwise manner under controlled conditions to form the azidophosphorane.

EXAMPLE I

One mole of purified triphenylphosphine recrystallized from isopropyl alcohol was dissolved in pyridine and added to a crude solution of one mole phenylphosphonyl diazide freshly prepared from phenylphosphonyl dichloride. An exothermic reaction resulted, with evolution of one mole of nitrogen. The solution was concentrated at reduced pressure, and the residue recrystallized. A stable light colored solid was obtained with a melting point of 110° to 126° C. Further purification and analysis showed the product to be phenylazidophosphonimidotriphenylphosphorane, $C_{24}H_{20}N_4OP_2$, a white crystalline solid, m.p. 143°–145° C. Upon analysis the compound was found to contain 14.1 percent phosphorus and had a molecular weight of 438.

Attempts were then made to hydrolyze this compound by adding water to a pyridine solution. Initially, the mixture became cloudy and after 30 minutes additional water was added causing a white solid to precipitate. After stirring another hour, the mixture was filtered to yield, after vacuum drying, a white powder, m.p. 148°–150° C. The infrared spectrum of this material was identical with that of previously obtained azidophosphorane, having a strong azide absorption at $2,138 \text{ cm}^{-1}$.

An additional quantity of the azidophosphorane, about 2.1 g (0.005 mole) was stirred overnight with aqueous sodium hydroxide. Since the sample had not dissolved in this time, it was heated on a steam bath for 8 hours without solution taking place. The sample was filtered, washed with water, and vacuum dried to yield 2.1 g (100 percent recovery) of azidophosphorane melting at 140°–145° C. The slightly low and wide melting point indicates some minor impurity although the infrared spectrum was unchanged. Thus, the stable azidophosphorane could not be hydrolyzed to the corresponding phosphonic acid.

In a similar manner it was found possible to synthesize an azidothiophosphorane by reaction of phenylthiophosphonyl diazide and triphenyl phosphine.

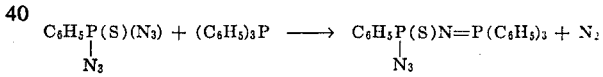

Here also it has been found that a stepwise reaction of thiophosphonyldiazide with tertiary phosphine yields products having new and unexpected advantages analgous to results obtained with the phosphonyl derivatives above.

EXAMPLE II

One mole of purified triphenyl phosphine was dissolved in pyridine. A crude solution of freshly prepared phenylthiophosphonyl diazide in pyridine was slowly added under reflux conditions. An exothermic reaction resulted and nitrogen was evolved. The product was an oil with a characteristic infrared azide absorption at $2,141 \text{ cm}^{-1}$ and was stable to hydrolysis. The product also showed a strong phosphorus to nitrogen double bond absorption at 1,242 to $1,220 \text{ cm}^{-1}$, typical of phenylazidothiophosphonimidotriphenylphosphorane. For further identification the product was reacted with methanol. A solution of 0.02 mole of starting material was used. It was necessary to reflux the reaction mixture for about 36 hours in order to complete the reaction (as followed by infrared spectroscopy). After removal of the solvent at reduced pressure and digestion with methanol, 4.5 grams (0.01 mole, 50 percent yield) of the desired methoxythiophosphorane was recovered. Recrystallization from methanol and Norite A gave an analytical sample melting at 121°–123° C. Further purification and analysis showed the product to be $C_{25}H_{23}NOP_2S$ with 3.17 percent nitrogen, 14.1 percent phosphorus and 7.02 percent sulfur.

Under the new controlled stepwise methods of reaction of the present invention for converting phosphines to phosphoranes, the synthesis of monohalophosphoranes proceeds as follows:

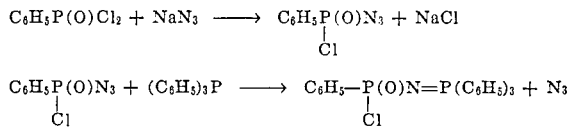

The resulting chlorophosphorane is a relatively reactive compound, forming the corresponding acid, on hydrolysis, in quantitative yield.

Subsequent reaction of such mono-halo compounds with sodium azide provides an alternate source of azidophosphoranes without the necessity of handling the potentially hazardous phosphonyldiazides, which the prior art teaches are necessary starting materials.

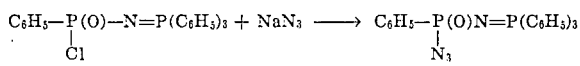

The synthesis of a typical haloazidophosphorane was carried out in the following manner.

EXAMPLE III

One mole of phenylphosphonyl dichloride and one mole of sodium azide in pyridine solution were stirred at 20° C. for 18 hours. One mole of triphenylphosphine in pyridine was then added. The mixture was cooled in an ice-water bath during the addition. The exothermic reaction yielded one mole of nitrogen. The mixture was warmed and refluxed for one hour. The product was found on analysis to be phenylchlorophsphonimidotriphenylphosphorane. The yield was 98 percent.

When a portion of the above solid was mixed with water, first an oil and than a solid was formed. Recrystallization from methanol and water gave a white crystalline precipitate, with a melting point of 205°–206° C. Analysis proved the compound to be $C_{24}H_{21}NO_2P_2$ with 14.6 percent phosphorus and a neutral equivalent of 413.

Another portion of the above solid was dissolved in pyridine and treated with an equimolar quantity of sodium azide over a period of 6-½ hours, and the reaction mixture poured into water, a white precipitate of phenylazidophosphonimidotriphenyl phosphorane was obtained. The yield was 97 percent of this compound melting at 142°–145° C.

Thus, it was found that under certain conditions a phenylphosphonyl diazide and triphenylphosphine react in a very clearly defined stepwise manner to yield an azidophosphorane which is thermally stable and resists hydrolysis. The product may be safely stored or purified for further reaction to the phenyldiphosphorane. When this method was extended to certain difunctional phosphines it was found that quantitative yields of new high molecular weight bisphosphoranes result, the products having pendant azido groups at each end of the molecule.

A typical compound of the present invention, also known as a bis(azidophosphorane), may be prepared by direct reaction of crude phenylphosphonyl diazide and a bis(tertiary phosphine). The product exhibits extreme thermal and hydrolytic stability and is readily soluble in the usual organic so vents making it relatively simple to purify such product or to carry out further polyconden-sation reactions. The preparation of N,N'-[p-phenylenebis(diphenylphosphoranylidyne)]bis(P-azido-P-phenylphosphonic amide) may be represented as follows:

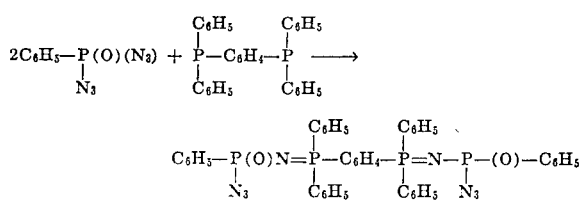

EXAMPLE IV

A solution of one mole of phenylphosphonyl dichloride was treated with two moles of sodium azide in pyridine, and allowed to stand for 18 hours. A pink solution resulted. To this was added a slurry of one mole of 1,4 bis(diphenylphosphino) benzene and 50 ml of pyridine. The initial reaction rate was rapid and exothermic and essentially complete in 0.5 hr. The nitrogen collected was found to be essentially quantitative. Salts were removed by filtration through a sintered glass funnel. Removal of the solvent at reduced pressure provided a tacky residue from which a quantity of the bis(azidophosphorane), m.p. 136°–138° C. was isolated. The product was found to have a molecular weight of 820, compared to 806 theory by the Neumeyer method.

The infrared spectrum of this material showed a strong azide at 4.72 microns as well as the typical phosphorane spectrum from 7–9 microns. In addition, there was a marked absence of any absorption at 10.4–10.9 microns which might have been ascribed to absorption as a result of hydrolysis. The infrared spectrum thus resembled the spectrum of pure compound prepared in pyridine. Analysis proved the compound to be $C_{42}H_{34}O_2N_8P_4$ with 15.5 percent phosphorus.

EXAMPLE V

The phenylphosphonyl diazide (2 moles), (Example IV) was prepared in a benzene pyridine solvent system with a molar ratio of 2:1 for the pyridine and phenylphosphonyl dichloride and then reacted with one mole of 4,4'-bis(diphenylphosphino)biphenyl in benzene at room temperature. For about 1-½ hours a stream of nitrogen was evolved. The mixture was filtered and the solvent removed from the filtrate to yield pale yellow solid with a melting range of 180°–200° C. The yield of this crude product was quantitative. The latter was then washed several times with acetone to yield a white solid with a melting point of 210°–212° C. The infrared spectrum was similar to that of the product made in Example IV including a strong azide absorption in the region of 4.70 microns. Analysis proved the compound to be $C_{48}H_{38}O_2N_8P_4$ with 14.1 percent phosphorus. The overall yield was 75 percent of the biphenyl bis(azidophosphorane) also known as N,N'-[p-Biphenylene bis(diphenylphosphoranylidyne)]- bis-(P-azido-P-phenylphosphonic Amide).

The present invention further includes a process for the preparation of a second new and previously unknown class of compounds, the bis(halophosphoranes). Such compounds are obtained by a similar stepwise reaction of phosphonyldihalide with one equivalent of sodium azide to yield a monohalophosphonyl azide and subsequent reaction of the product with a compound having two pendant tertiary phosphine groups per molecule.

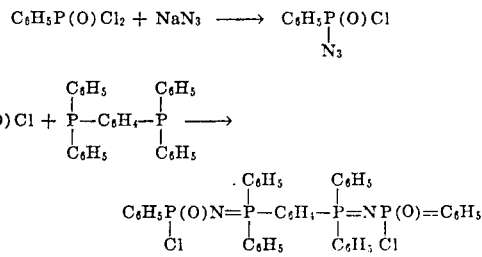

The resulting bis(halophosphoranes) may than be further converted into bis-azido compounds by the method of Example IV utilizing 2 moles of sodium azide per mole of bis(halophosphorane). Such bis(halophosphoranes) also were found to have chemically active halogen groups which readily undergo condensation reactions with polyamines and polyglycols to produce phosphorane-bearing polyesters and polyamides of a new and novel nature.

EXAMPLE VI

One mole of phenylphosphonyl dichloride was reacted with 1.0 mole of sodium azide dissolved in dry pyridine by stirring at room temperature for 18 hours. Thereafter 0.5 mole of 1,4-bis(diphenylphosphino) benzene in pyridine was added, cooling the mixture in an ice-bath during the addition. The product was obtained by removal of the solvent and crystallizing. Analysis and infrared spectra showed the product, to be the bis-(chlorophosphorane), also known as N,N'[p-phenylenebis-(diphenylphosphoranylidyne)]-bis(P-chloro-P-phenylphosphonic amide).

This product was then dissolved in a mixture of benzene and pyridine and stirred with two moles of sodium azide. The rapid foregoing reaction was complete in 6 hours. The salts were filtered under nitrogen pressure; and the filtrate concentrated to yield a tan powder. The product was found to be identical to the bis(azidophosphorane) of Example IV.

EXAMPLE VII

One mole of the bis(chlorophosphorane), prepared as in Example VI, is dissolved in dimethylformamide. One mole of hydroquinone is slowly added until the evolution of HCl ceases. The mixture is heated with stirring until a thick mass of polymer is obtained. The resulting phosphorane-containing polyester can be vacuum distilled to remove dimethylformamide solvent and other volatile materials and yield a linear polymer:

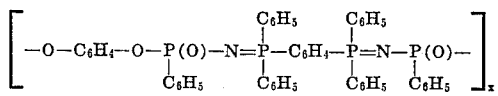

where $x$ indicates the degree of polymerization.

EXAMPLE VIII

One mole of bis(chlorophosphorane), prepared as in Example VI is dissolved in dimethylsulfoxide. One mole of p-phenylenediamine and two moles of triethylamine are added. Heating at reflux temperature and removal of the salts and volatiles in vacuo yields a linear polymer:

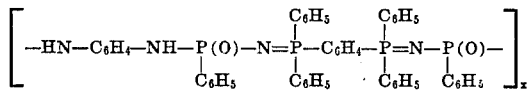

where $x$ is the degree of polymerization.

The polyesters and polyamides of Examples VII and VIII thus modified with phosphorane linkages possess unique properties as fire retardant materials and as modifiers of conventional polyamides and polyesters.

The bis-halo and bis(azidophosphorane) compounds of Examples IV, V and VI are readily soluble in organic polymer solvents such as pyridine, dimethylformamide and dimethylsulfoxide. Solutions of these pure compounds can then be subjected to further high temperature condensation reactions under optimum controlled conditions not possible in previously known systems which required that the hazardous crude phosphonyl diazide reaction mixtures remain in low boiling point solvents for subsequent polymerization reactions.

The product of Example IV and V, the bis(azidophosphorane), can be converted to a tetraphosphorane by reaction with triphenylphosphine in benzene, toluene, or similar hydrocarbons. When the reaction is carried out in pyridine, dimethylformamide or dimethylsulfoxide excellent yields of tetraphosphorane are obtained.

EXAMPLE IX

One mole of triphenylphosphine was dissolved in pyridine and 0.5 mole of the bis(azidophosphorane) (Example IV) was added at reflux temperature. The nitrogen evolved was 96 percent of the theoretical amount. Removal of the solvent under reduced pressure and recrystallization yielded 91 percent of light yellow crystals melting at 101°–103° C. Analysis proved the compound to be the tetraphosphorane, $C_{78}H_{84}O_2N_4P_6$ with 14.3 percent phosphorus and a molecular weight of 1,250 compared to the theoretical value of 1,275.

Subsequent reaction of the bis(azidophosphorane) of Example IV and V with 1,4-bis(diphenylphosphino) benzene in a variety of solvents such as dimethylformamide, dimethylsulfoxide or hexamethyl phosphoric triamide resulted in unique polyphosphoranes from which numerous fibers and disks were formed. The products of such controlled polycondensation represent a useful class of polyphosphoranes possessing unusual properties. More thermally stable phosphorane resins are obtained by a careful control of the purity of the reacting monomers, and of the stoichiometry of the reacting components. In addition these high temperature stable resins are more resistant to hydrolyzed phosphonyldiazide compounds in the polymers. Moreover, the use of more effective polymer solvents makes it possible to monitor the polymerization reactions through the use of standard instrumental control methods until products of specified molecular weights are obtained.

Depending on the choice of reactants these polymeric phosphoranes are useful as ablative materials and as structural plastics. High molecular weight polymeric phosphoranes provide new thermally stable polymers which can be drawn into fibers, fabricated into film and sheet laminates, or incorporated into varnishes for use as surface coatings. The phosphorus content of these products imparts a high degree of resistance to combustion, giving them an additional utility as fire-retardant materials, and as polymer modifiers.

While the process of preparation of the bis(halophosphoranes) and bis(azidophosphoranes) of the present invention is conveniently carried out at room temperature initially, followed by periods of heating at the reflux temperature of the pyridine solvent (110° to 120° C.) the reaction temperatures can range from −20° to 150° C. depending upon the choice of solvent and chemical and physical properties of the reactants. The compounds of the present invention can be prepared in a variety of solvents such as pyridine, acetonitrile, triethylamine, di-n-butyl ether, benzene, toluene, dimethylformamide, dimethylsulfoxide and the like. Depending upon the particular halogen substituent used, such as fluoride, chloride, bromide and iodide and the number and type of substituents on the phosphorus compounds the reaction time may also vary from a few hours to a few days.

It should be noted that the bis(azidophosphorane) of Example IV and VI may be separately isolated and thereafter reacted with a different bistertiary phosphine than that used for the preparation of the bis-azidophosphoranes. By this technique for the first time it has become possible to vary the properties of the final polyphosphoranes. This is one additional manner in which the stable bis(azidophosphorane) materials of the present invention have a unique utility and lead to polyphosphorane materials of superior properties.

While the present invention has been described in terms of what at present are preferred embodiments thereof, it will be understood, of course, that various changes, substitutions, modifications and the like may be made therein without departing from the true scope of the invention as defined in the appended claims.

What is claimed is:

1. A high molecular weight linear polymer having the formula

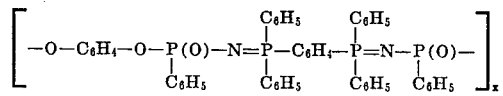

where $x$ indicates the degree of polymerization.

* * * * *

UNITED STATES PATENT OFFICE
CERTIFICATE OF CORRECTION

Patent No. 3,674,742          Dated July 4, 1972

Inventor(s) Roger A. Baldwin and Ming T. Cheng

It is certified that error appears in the above-identified patent and that said Letters Patent are hereby corrected as shown below:

Col. 1, line 17 - "fir-retardants" should read
    -- fire-retardants -- line 62 - "1 and 3" should read -- 1 to 3 --

Col. 3, lines 3 and 4 - equation should read $$\text{C}_6\text{H}_5\text{P(O)N}_3 + (\text{C}_6\text{H}_5)_3\text{P} \longrightarrow \text{C}_6\text{H}_5\text{-P(O)N=P}(\text{C}_6\text{H}_5)_3 + \text{N}_2$$
$$\phantom{xxxx}|\phantom{xxxxxxxxxxxxxxxxxxxxxxxxxxxxxx}|$$
$$\phantom{xxx}\text{Cl}\phantom{xxxxxxxxxxxxxxxxxxxxxxxxxxxxx}\text{Cl}$$

lines 31 and 32 -
    "phenylchlorophsphonimidotriphenylphosphorane" should
    read --phenylchlorophosphonimidotriphenylphosphorane -- line 44 - "142° - 14" should read -- 142° - 145° -- line 45 - delete "5°"

line 60 - "so vents" should read -- solvents -- line 62 - "polyconden-sation" should read
    -- polycondensation --

Col. 6, line 9 - formula should read -- $C_{78}H_{64}O_2N_4P_6$ --

Signed and sealed this 5th day of December 1972.

(SEAL)
Attest:

EDWARD M. FLETCHER, JR.
Attesting Officer

ROBERT GOTTSCHALK
Commissioner of Patents